(12) United States Patent
Hammer et al.

(10) Patent No.: US 10,625,707 B2
(45) Date of Patent: Apr. 21, 2020

(54) ADHESIVE HOOD REINFORCEMENT FOR PEDESTRIAN PROTECTION

(71) Applicant: Toyota Motor Engineering & Manufacturing North America, Inc., Plano, TX (US)

(72) Inventors: Jeremiah T. Hammer, Ann Arbor, MI (US); Troy N. Grantham, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 31 days.

(21) Appl. No.: 15/955,436

(22) Filed: Apr. 17, 2018

(65) Prior Publication Data

US 2019/0315305 A1 Oct. 17, 2019

(51) Int. Cl.
*B60R 21/34* (2011.01)
*B62D 25/12* (2006.01)

(52) U.S. Cl.
CPC ............. *B60R 21/34* (2013.01); *B62D 25/12* (2013.01); *B60R 2021/343* (2013.01)

(58) Field of Classification Search
CPC .... B60R 21/34; B60R 2021/343; B62D 25/12
See application file for complete search history.

(56) References Cited

U.S. PATENT DOCUMENTS

| | | | |
|---|---|---|---|
| 4,883,309 A | 11/1989 | Miyazaki et al. | |
| 6,685,243 B1 | 2/2004 | Evans | |
| 6,789,837 B2 | 9/2004 | Mitsui et al. | |
| 8,016,347 B2 | 9/2011 | Uchino | |
| 9,452,787 B2 | 9/2016 | Nakano et al. | |
| 9,487,239 B2 | 11/2016 | Schnug et al. | |
| 9,550,463 B2 | 1/2017 | Hara et al. | |
| 9,868,465 B2 | 1/2018 | Kurokawa | |
| 9,868,472 B2 * | 1/2018 | Takada | B60R 21/34 |
| 2009/0188100 A1 | 7/2009 | Durney et al. | |
| 2015/0314363 A1 | 11/2015 | Nelson et al. | |
| 2016/0159300 A1 | 6/2016 | Matecki et al. | |

FOREIGN PATENT DOCUMENTS

| | | |
|---|---|---|
| CN | 101395057 | 3/2009 |
| EP | 1256509 | 11/2002 |
| EP | 1844993 | 10/2007 |
| JP | 2002127936 | 5/2002 |
| JP | 2015202761 | 11/2015 |

* cited by examiner

*Primary Examiner* — D Glenn Dayoan
*Assistant Examiner* — Melissa Ann Bonifazi
(74) *Attorney, Agent, or Firm* — Snell & Wilmer LLP

(57) ABSTRACT

Systems and apparatus for a vehicle for improving pedestrian safety. The apparatus includes a hood of a vehicle including a hood outer panel having an exterior surface and an interior surface. The hood includes a hood inner panel connected to the hood outer panel. The hood includes a reinforcing patch connected to the interior surface of the hood outer panel between the hood outer panel and the hood inner panel, at a reinforcing location aligned with a structural component of the vehicle. The reinforcing patch is configured to increase the rigidity and mass of the hood outer panel at the reinforcing location to absorb energy from a pedestrian struck by the vehicle and to reduce impact from the structural component of the vehicle onto the pedestrian when the hood outer panel and the hood inner panel become compressed onto the structural component of the vehicle.

20 Claims, 10 Drawing Sheets

ADHESIVE HOOD REINFORCEMENT FOR PEDESTRIAN PROTECTION

BACKGROUND

1. Field

This specification relates to a system and a method for improving the safety of vehicle hood assemblies when a pedestrian comes into contact with a hood of a vehicle.

2. Description of the Related Art

Vehicles may include vehicle hood assemblies positioned at a front of the vehicle. The vehicle hood assemblies may cover mechanical and electrical components of the vehicle, including an engine, a motor, and/or a transmission. In a situation where the vehicle makes contact with a pedestrian, the pedestrian may strike any part of the front of the vehicle, including the hood assembly. The hood assembly may deform in response to making contact with the pedestrian. However, a significant source of impact to the pedestrian may be caused by the underlying, more rigid, structural components of the vehicle underneath the hood assembly.

Thus, there is a need for improved vehicle apparatus or systems for limiting injury to the pedestrian when the vehicle makes contact with the pedestrian.

SUMMARY

What is described is a hood of a vehicle including a hood outer panel having an exterior surface and an interior surface opposite the exterior surface. The hood also includes a hood inner panel connected to the hood outer panel and configured to provide structural support to the hood outer panel. The hood inner panel has an exterior surface facing the interior surface of the hood outer panel and an interior surface. The hood also includes a reinforcing patch connected to the interior surface of the hood outer panel between the hood outer panel and the hood inner panel, at a reinforcing location aligned with one or more structural components of the vehicle. The reinforcing patch is configured to increase the rigidity and mass of the hood outer panel at the reinforcing location to absorb energy from a pedestrian struck by the vehicle and to reduce impact from the one or more structural components of the vehicle onto the pedestrian when the hood outer panel and the hood inner panel become compressed onto the one or more structural components of the vehicle.

Also described is a vehicle for improving pedestrian safety. The vehicle includes a hood. The hood includes a hood outer panel having an exterior surface and an interior surface opposite the exterior surface. The hood also includes a hood inner panel connected to the hood outer panel and configured to provide structural support to the hood outer panel. The hood inner panel has an exterior surface facing the interior surface of the hood outer panel and an interior surface. The hood also includes a reinforcing patch connected to the interior surface of the hood outer panel between the hood outer panel and the hood inner panel, at a reinforcing location aligned with one or more structural components of the vehicle. The reinforcing patch is configured to increase the rigidity and mass of the hood outer panel at the reinforcing location to absorb energy from a pedestrian struck by the vehicle and to reduce impact from the one or more structural components of the vehicle onto the pedestrian when the hood outer panel and the hood inner panel become compressed onto the one or more structural components of the vehicle.

Also described is a hood outer panel assembly of a vehicle including a hood outer panel having an exterior surface and an interior surface opposite the exterior surface. The hood outer panel assembly also includes a reinforcing patch connected to the interior surface of the hood outer panel at a reinforcing location aligned with one or more structural components of the vehicle. The reinforcing patch is configured to increase the rigidity and mass of the hood outer panel at the reinforcing location to absorb energy from a pedestrian struck by the vehicle and to reduce impact from the one or more structural components of the vehicle onto the pedestrian when the hood outer panel becomes compressed onto the one or more structural components of the vehicle, the one or more structural components of the vehicle having a higher rigidity, a higher mass, and a higher resistance to deformation than the hood outer panel.

BRIEF DESCRIPTION OF THE DRAWINGS

Other systems, methods, apparatus, features, and advantages of the present invention will be apparent to one skilled in the art upon examination of the following figures and detailed description. Component parts shown in the drawings are not necessarily to scale, and may be exaggerated to better illustrate the important features of the present invention.

DETAILED DESCRIPTION

Disclosed herein are systems and apparatus for improving safety of vehicle hood assemblies when a pedestrian makes contact with a vehicle. For example, an adhesive hood reinforcement rigid patch may be strategically placed or located on an interior surface of a hood outer panel or between a hood outer panel and a hood inner panel for protecting a pedestrian's head during an accidental impact. In some configurations, the reinforcement rigid patch is located over or adjacent to a rigid structural component of the vehicle so that impact of the pedestrian's head is better absorbed. Conventional approaches to increasing pedestrian safety have been directed to creating more easily deformable hood outer panels, but in contrast, the adhesive hood reinforcement rigid patch disclosed herein effectively makes the hood outer panel less deformable by increasing the rigidity and mass of the hood outer panel at the location where the adhesive hood reinforcement patch is located. This may be a counterintuitive approach having unexpected results, but the results shown by simulation data presented herein illustrate the effectiveness of the adhesive hood reinforcement patch in lowering head injury to a pedestrian who accidentally contacts the vehicle.

During a pedestrian-to-vehicle impact, the head of the pedestrian may strike the hood of the vehicle. To minimize the injury to the pedestrian's head, a relatively soft impact is desirable, while avoiding large accelerations as the vehicle components underneath the hood become compressed, or "stacked up." When the hood of the vehicle is incapable of absorbing sufficient amounts of energy prior to this "stacking up" of components underneath the hood, relatively high acceleration to the head of the pedestrian may be experienced. In some situations, as will be explained herein, it may be desirable to increase acceleration of the head of the pedestrian early in the collision in order to avoid acceleration of more significant magnitude later in the collision.

Pedestrian head injury may be quantified by the head injury criterion (HIC), which correlates to skull fracture. HIC is based on time and acceleration of the head during the impact, and is expressed as by the formula:

$$HIC = \left\{ \left[ \frac{1}{t_2 - t_1} \int_{t_1}^{t_2} a(t) dt \right]^{2.5} (t_2 - t_1) \right\}_{max}.$$

By minimizing acceleration as much as possible, the HIC of a collision may be reduced.

Figure 1:
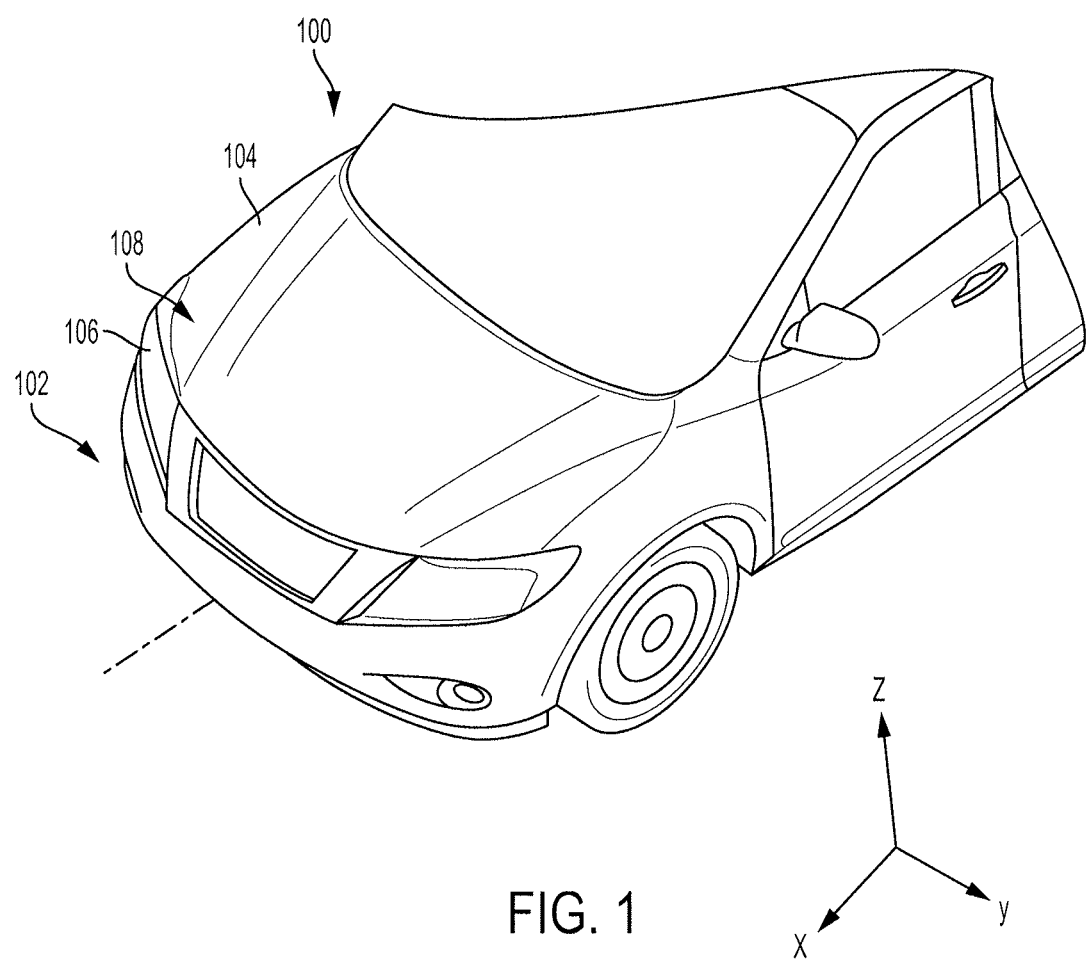
FIG. 1 illustrates a portion of a vehicle including a vehicle hood, according to various embodiments of the invention.

FIG. 1 illustrates an elevated perspective view of a portion of a vehicle 100 having a front end 102. The front end 102 of the vehicle includes, among other things, a hood 104 and a headlight compartment 106. The hood 104 is configured to cover internal mechanical and electrical components of the vehicle 100, such as an engine, a motor, a transmission, a battery, or an electronic control unit, for example. The headlight compartment 106 is configured to house a headlight and may have reflective inner walls for the light emitted from the headlight to reflect off of. Portions of the headlight compartment 106 may be located underneath the hood 104.

When the vehicle 100 is traversing a road, it may accidentally make contact with a pedestrian. A body part of the pedestrian may make contact with the front end 102 of the vehicle 100. In some situations, the head of the pedestrian may make contact with the hood 104 of the vehicle 100. If the head of the pedestrian makes contact with the hood 104 of the vehicle 100, the hood 104 of the vehicle 100 may deform from contact with the pedestrian's head.

In some situations, the hood 104 may deform and compress onto the vehicle components located beneath the hood 104. For example, when the pedestrian's head makes contact at location 108, the hood 104 may compress onto the headlight compartment 106, which compresses onto the rigid structural components of the vehicle 100, such as the chassis (or underbody, structural support, or frame). When these vehicle components (e.g., hood and headlight compartment) compress onto each other, the pedestrian's head may experience increased acceleration when each of the vehicle components compress onto the rigid structural components of the vehicle 100.

The greatest amount of acceleration is experienced by the head of the pedestrian when the rigid structural components of the vehicle 100 are reached. In a first example situation, the head of a pedestrian may contact the hood 104 of the vehicle 100, and the hood 104 may deform and compress onto the headlight compartment 106, but there may not be enough force from the head of the pedestrian to compress the headlight compartment 106 onto the rigid structural components of the vehicle 100. In a second example situation, the head of the pedestrian may contact the hood 104 of the vehicle 100, which deforms and compresses onto the headlight compartment 106, which in turn compresses onto the rigid structural components of the vehicle 100. A significantly less amount of head injury is experienced by the head of the pedestrian in the first example situation where compression onto the rigid structural components of the vehicle 100 may be avoided, as the rigid structural components have a much higher inertia than the other intervening components (e.g., the hood and the headlight compartment) and accordingly cause a much greater head injury.

This increased head injury experienced from acceleration from the rigid structural components of the vehicle 100 may be so great that it may be more beneficial to stiffen the hood and absorb more of the impact from the pedestrian upfront (i.e., earlier in the collision) than to allow the hood to deform more easily and experience more impact from the rigid structural components. In other words, it is desirable to limit the compression of the vehicle components so that the acceleration from the rigid structural components of the vehicle 100 may be reduced.

Figure 2B:
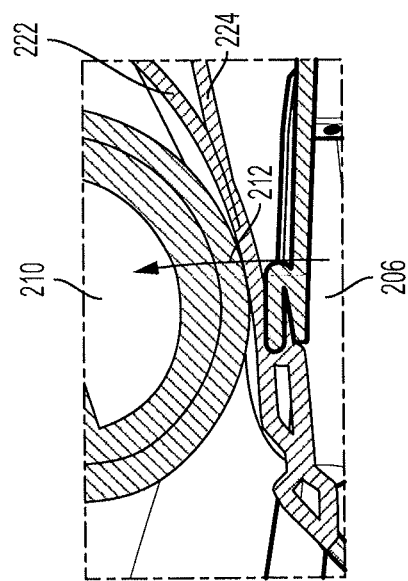
FIGS. 2A-2B illustrate a cross-sectional view of a portion of the vehicle hood assembly when a headform makes contact with a vehicle hood not having a reinforcing patch, according to various embodiments of the invention.
Figure 2A:
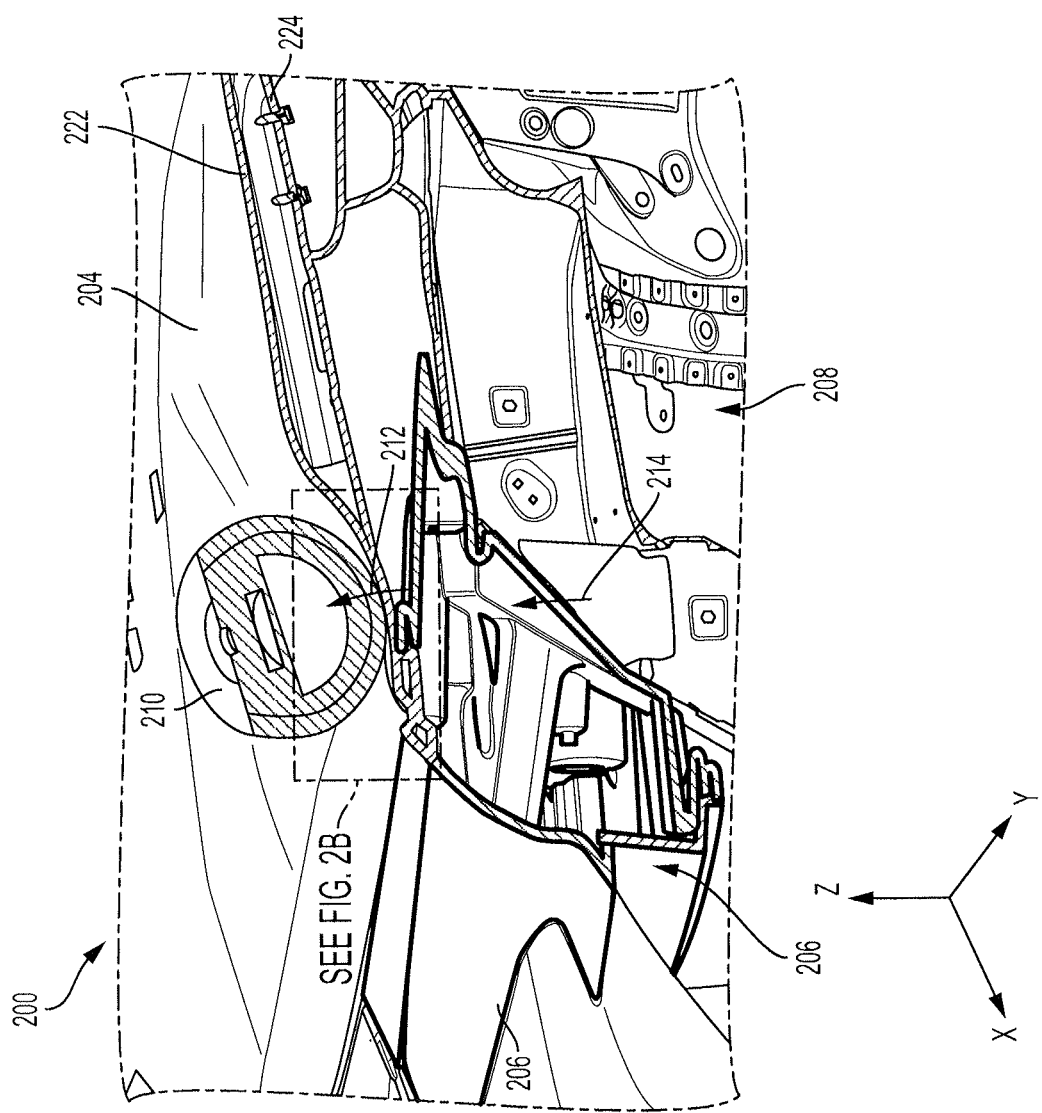

FIGS. 2A-2B illustrate a cross-sectional view of a portion of the vehicle hood assembly when a headform makes contact with a vehicle hood not having a reinforcing patch. FIGS. 2A and 2B illustrate a compression to be avoided. A perspective view and cross section of the hood 204 and the headlight compartment 206 are shown.

The hood 204 may be a hood assembly having two major structural parts—a hood outer panel 222 and a hood inner panel 224. The hood inner panel 224 is connected to the hood outer panel 222 and gives structure to the hood outer panel 222. The hood inner panel 224 may be fixed to the hood outer panel 222 by welding, using an adhesive, or by using fasteners, such as screws, bolts, or rivets, for example.

The hood outer panel 222 may be formed of a generally rigid and durable material such as steel or aluminum. However, it should be appreciated that other material, such as fiberglass, carbon fiber, dry carbon or a composite material may be used to construct the hood outer panel 222. The hood inner panel 224 may be formed of a generally rigid and durable material such as steel or aluminum. However, it should be appreciated that other material, such as fiberglass, carbon fiber, or dry carbon may be used to construct the hood inner panel 224.

A headform 210 representing a pedestrian's head is shown making contact with the hood 204 and compressing the hood 204. In particular, the hood outer panel 222 is compressed onto the hood inner panel 224, and the hood 204 is compressed onto the headlight compartment 206. The headlight compartment 206 is in turn compressed onto the structural components 208 of the vehicle 100. The force from the structural components 208 to the headlight compartment 206 is shown by arrow 214, and the force from the headlight compartment 206 to the hood 204 to the headform 210 is shown by arrow 212. This compression of the structural components 208 of the vehicle 100 onto the headform 210 is preferably avoided or reduced, in order to reduce injury to the head of the pedestrian. To this end, it is desirable for the hood 204 to retain its shape as much as possible before being compressed onto the structural components 208 of the vehicle 100.

Figure 3A:
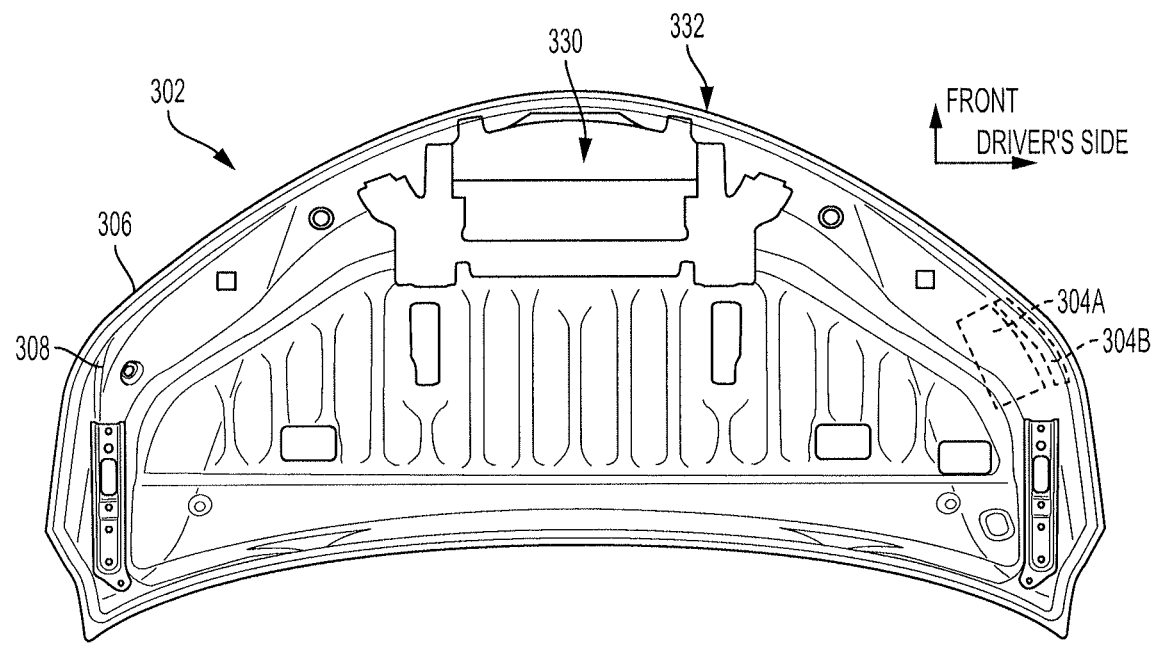
FIG. 3A illustrates a bottom view of the hood inner panel of the hood assembly with a reinforcing patch, according to various embodiments of the invention.

FIG. 3A illustrates a bottom (or inner) view of a hood 302. When the hood 302 is reinforced, the compression of the hood 302 onto the structural components of the vehicle 100 may be reduced or delayed. In addition, the reinforced hood may be capable of absorbing more energy from the pedestrian.

The hood 302 has a hood outer panel 306 and a hood inner panel 308. The hood 302 also includes a reinforcing patch 304. The reinforcing patch 304 is located between the hood outer panel 306 and the hood inner panel 308. The reinforcing patch 304 may be attached to an interior surface of the hood outer panel 306. The reinforcing patch 304 may be attached via an adhesive, by magnetism, or by using fasteners, such as screws, bolts, or rivets, for example. The reinforcing patch 304 is a rigid patch that increases the rigidity, mass, and stiffness of the hood outer panel 306. The increased rigidity, mass, and stiffness of the hood outer panel 306 helps to absorb energy earlier in the collision, and causes reduced or delayed compression of the hood onto the elements below the hood, including the rigid structural elements of the vehicle. The mass of the reinforcing patch 304 also absorbs energy during the collision from the pedestrian.

In some embodiments, the reinforcing patch 304 is a single piece, and in other embodiments, the reinforcing patch 304 is in the form of two separate patches 304A and 304B, each configured for the same or similar purpose. In these embodiments, the reinforcing patch 304 is separated into two patches to avoid certain design features of the hood outer panel 306. These design features may include curves or raised edges. In some situations, these design features are avoided because the reinforcing patch 304 may encounter some shrinking in the process of being applied to the hood outer panel 306, and when the reinforcing patch 304 is located on a design feature, the reinforcing patch may not completely adhere to portions of the hood outer panel 306 where the design features are located.

Figure 3B:
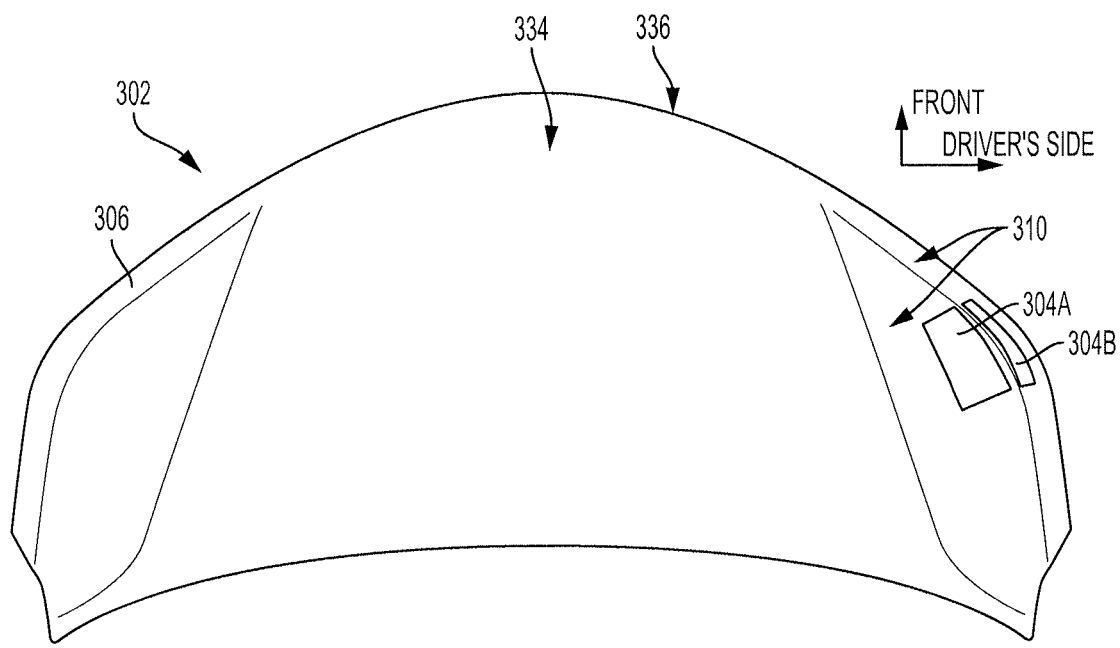
FIG. 3B illustrates a bottom view of the hood outer panel of the hood assembly with a reinforcing patch, according to various embodiments of the invention.

FIG. 3B illustrates a bottom (or inner) view of the hood 302. The reinforcing patches 304A and 304B are separated to avoid design curves 310. In some embodiments, the design curves of the hood 302 provide reinforcement to the hood 302, and further reinforcement may not be required. As shown in FIGS. 3A and 3B, the reinforcing patch 304 may not be visible (i.e., hidden from view) from either the inside of the hood 302 or the outside of the hood 302, as it is located between the hood outer panel 306 and the hood inner panel 308. Accordingly, the reinforcing patch 304 may be attached to the interior surface of the hood outer panel 306 prior to the connection of the hood outer panel 306 and the hood inner panel 308.

Figure 3C:
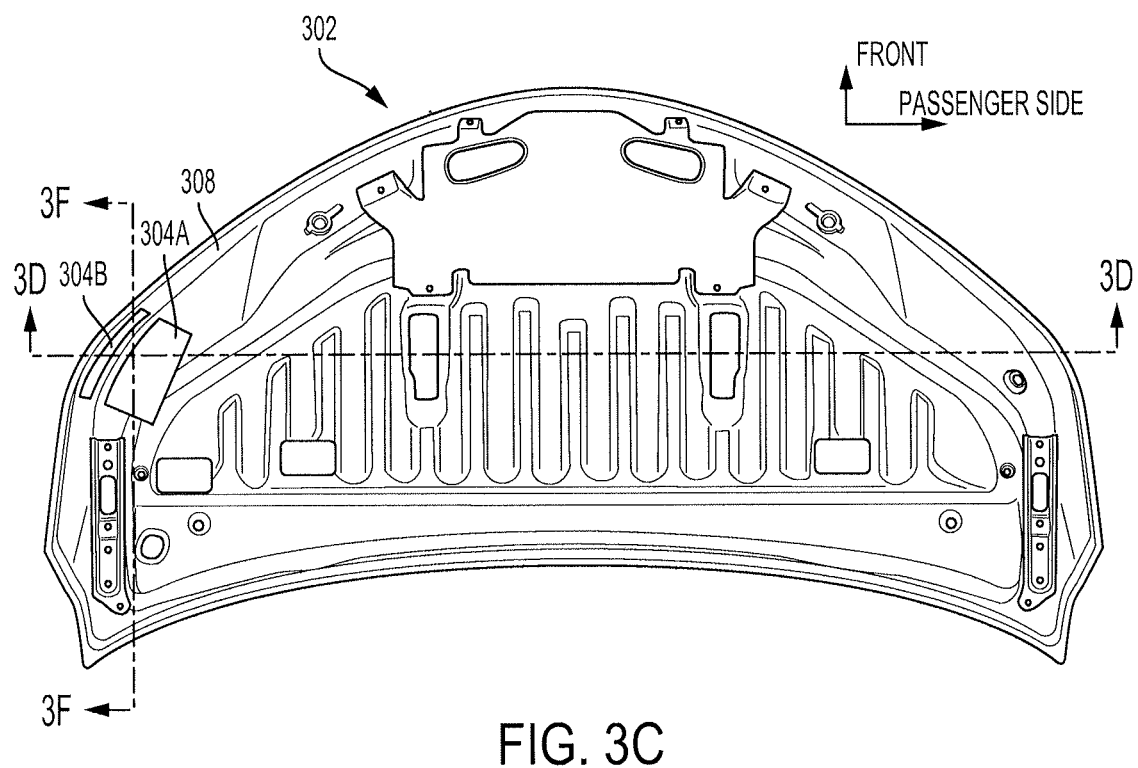
FIG. 3C illustrates a top view of the inner hood panel of the hood assembly with a reinforcing patch, according to various embodiments of the invention.

FIG. 3C illustrates a top view of the hood inner panel 308 and the relative location of the reinforcing patch 304.

Figure 3D:
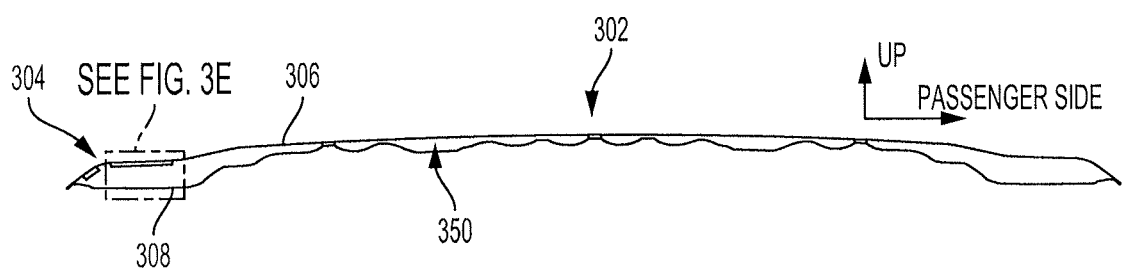
FIG. 3D illustrates a widthwise cross-sectional view of the hood assembly with a reinforcing patch, according to various embodiments of the invention.
Figure 3E:
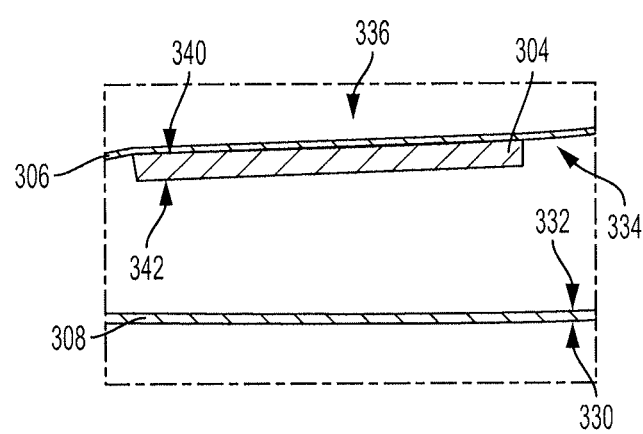
FIG. 3E illustrates a close-up section of the widthwise cross-sectional view of the hood assembly shown in FIG. 3D, according to various embodiments of the invention.

FIGS. 3D and 3E illustrate a widthwise cross-sectional view of the hood 302. FIGS. 3D and 3E illustrate the hood outer panel 306 and the hood inner panel 308, as well as the reinforcing patch 304. The reinforcing patch 304 is located within the cavity 350 between the hood outer panel 306 and the hood inner panel 308. The reinforcing patch 304 supports the hood outer panel 306 and assists the hood outer panel 306 from being deformed and compressed onto the hood inner panel 308 when the hood 302 is contacted by a pedestrian or pedestrian's head.

As shown in FIG. 3E, the reinforcing patch 304 has a top side 340 and a bottom side 342. The top side 340 of the reinforcing patch 304 is attached to the bottom (or interior) side 334 of the hood outer panel 306. The reinforcing patch 304 may be attached to the bottom side 334 of the hood outer panel 306 via an adhesive or via a fastener. The hood outer panel 306 also has a top (or exterior) side 336. The bottom side 342 of the reinforcing patch 304 faces the top side 332 of the hood inner panel 308. The bottom side 330 of the hood inner panel 308 faces vehicle components, such as a headlight compartment, rigid structural components of the vehicle, or other components located underneath the hood 302 of the vehicle 100.

Figure 3F:
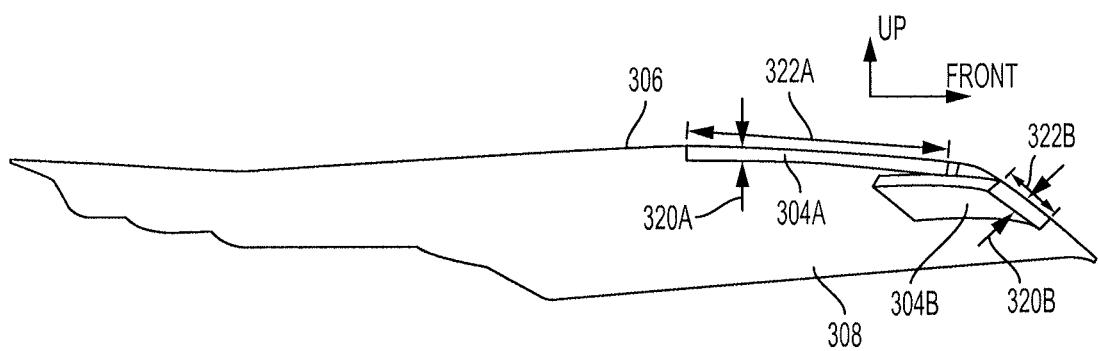
FIG. 3F illustrates a lengthwise cross-sectional view of the hood assembly with a reinforcing patch, according to various embodiments of the invention.

FIG. 3F illustrates a lengthwise cross-sectional view of the hood 302. FIG. 3F illustrates the hood outer panel 306 and the hood inner panel 308, as well as the reinforcing patch 304. The reinforcing patch 304 may include two reinforcing patches 304A and 304B. The first reinforcing patch 304A may have a first thickness 320A and a first length 322A. The second reinforcing patch 304B may have a second thickness 320B and a second length 322B. The first thickness 320A may be the same as the second thickness 320B, or may be different. The first length 322A may be the same as the second length 322B, or may be different. In many embodiments, the length and thickness of a particular reinforcing patch will depend on optimized values determined by testing and/or simulation. The length, thickness, and shape of the reinforcing patch may also be based on the location of the reinforcing patch on the hood 302.

While FIGS. 3D-3F illustrate each reinforcing patch as having a consistent thickness, in some embodiments, the reinforcing patch may have varying thickness across the length or width of the reinforcing patch. For example, the reinforcing patch may be thicker on one end of the reinforcing patch and thinner on an opposite end of the reinforcing patch. A particular end of the reinforcing patch may be thicker because it is located above a highly rigid structural component of the vehicle, and the other, thinner end of the reinforcing patch may be located above a less rigid structural component of the vehicle. In other situations, a particular end of the reinforcing patch may be thicker because it is located relatively close to a rigid structural component of the vehicle than the other, thinner end of the reinforcing patch, which is located farther away from a rigid structural component of the vehicle. The tapered or varying thickness reinforcement patch 304 advantageously allows for the rigid structural component to have a thicker patch and for other areas to have a thinner patch to achieve a lighter vehicle weight, better fuel or energy efficiency and cost savings.

Other solutions may involve adding brackets to portions of the hood, changing materials the hood is made of, or increasing the thickness of the entire hood outer panel 306. In addition, these other solutions may not perform the functions of the reinforcing patch 304 as well as the reinforcing patch 304 does.

The reinforcing patch 304 is also capable of being sufficiently self-contained that its presence on the hood outer panel 306 does not affect the functioning of other components of the vehicle. The addition of other more bulky or heavy components may disturb the balance of the vehicle and the weight of the vehicle.

While the reinforcing patch 304 is shown as being on the driver's side of the hood 302, there may be a plurality of reinforcing patches in the hood assembly, and they may be located at any other place on the interior side 334 of the hood outer panel 306. Exact locations, sizes, and dimensions of the reinforcing patch 304 may be optimized to balance weight, size, cost, and added rigidity and mass.

The reinforcing patch may be a dual-layer patch having a resin-coated glass cloth layer and a heat activated expanding polymer layer. The polymer may be made of epoxy or an epoxy and rubber blend. The heat activated expanding polymer layer may be the layer contacting the interior surface of the hood outer panel 306.

As used herein, "rigidity" and "stiffness" may be used interchangeably, and may both refer to a particular material's resistance to deformation. A particular material may have an associated Young's modulus (or elastic modulus), which measures the stiffness of the particular material. For example, rubber may have an associated Young's modulus of 0.01-0.1 GPa (gigapascals), fiberglass may have an associated Young's modulus of 17.2 GPa, aluminum may have an associated Young's modulus of 69 GPa, and steel may have an associated Young's modulus of 209 GPa.

The rigid structural components of the vehicle may have a much greater Young's modulus and mass than the hood outer panel and the hood inner panel. For example, the rigid structural components of the vehicle may be the chassis made of steel, having a Young's modulus of 209 GPa and the hood outer panel may be made of aluminum, having a Young's modulus of 69 GPa. The combination of the adhesive patch and the hood outer panel may increase the Young's modulus of the hood outer panel. For example, the hood outer panel may have a Young's modulus of 69 GPa, but with the adhesive patch, the reinforced hood outer panel may have a Young's modulus greater than 69 Gpa (e.g., between 80 Gpa and 160 Gpa). In some embodiments, the Young's modulus of the reinforced hood outer panel (having the adhesive patch) may be greater than the Young's modulus of the unreinforced hood outer panel, but less than the Young's modulus of the rigid structural components of the vehicle.

Figure 4B:
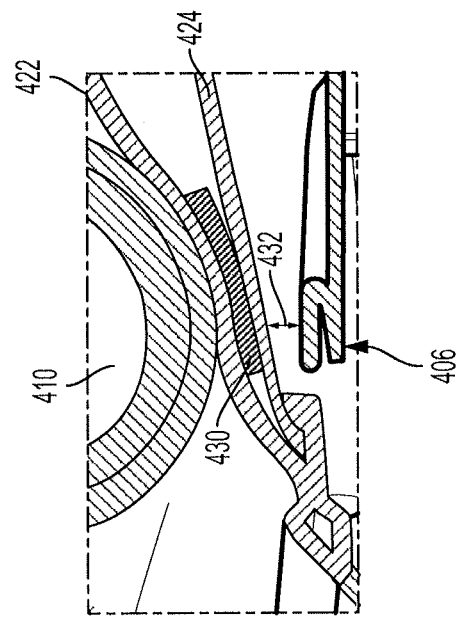
FIGS. 4A-4B illustrate a cross-sectional view of a portion of the vehicle hood assembly when a headform makes contact with a vehicle hood with a reinforcing patch, according to various embodiments of the invention.
Figure 4A:
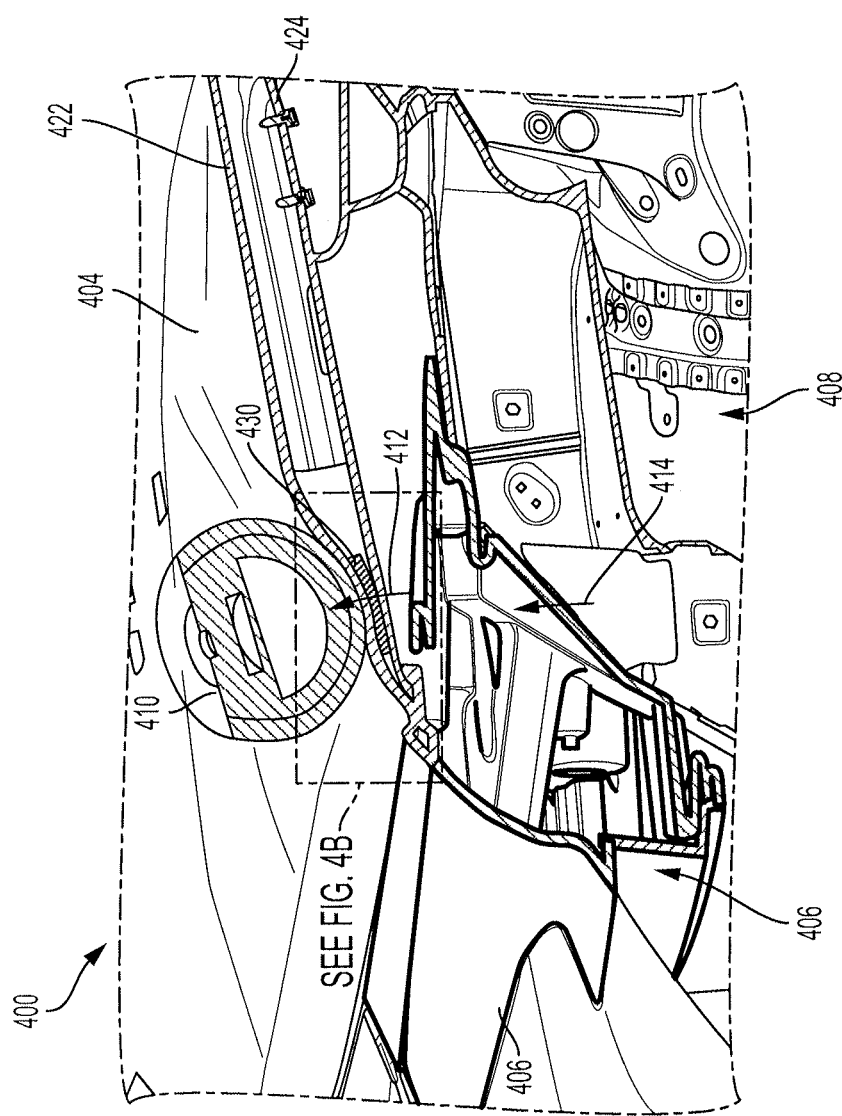

FIGS. 4A and 4B illustrate a partial cross section of the front end of the vehicle 400 with a reinforcing patch on the hood 404. FIGS. 4A and 4B are similar to FIGS. 2A and 2B, but FIGS. 4A and 4B have reinforcing patch 430 located between the hood outer panel 422 and the hood inner panel 424. The reinforcing patch 430 is attached to the inner surface of the hood outer panel 422. As shown in FIGS. 4A and 4B, the reinforcing patch 430 is located above the headlight compartment 406.

When the headform 410 contacts the hood 404 with the reinforcing patch 430, the reinforcing patch 430 absorbs a portion of the impact of the headform 410 onto the hood 404, and the compression of the hood outer panel 422 onto the hood inner panel 424 (and then onto the headlight compartment 406) is reduced, as shown in FIG. 4B. As compared to FIG. 2A, the reinforcing patch 430 reduces the compression of the hood 404 and maintains a gap 432 between the hood 404 and the structural components 408 of the vehicle. This gap 432, even if eventually occupied by the deformed hood 404, is maintained for a longer period of time due to the reinforcing patch 430. Accordingly, injury to the head of the pedestrian may be reduced in the event of a collision.

Figure 5:
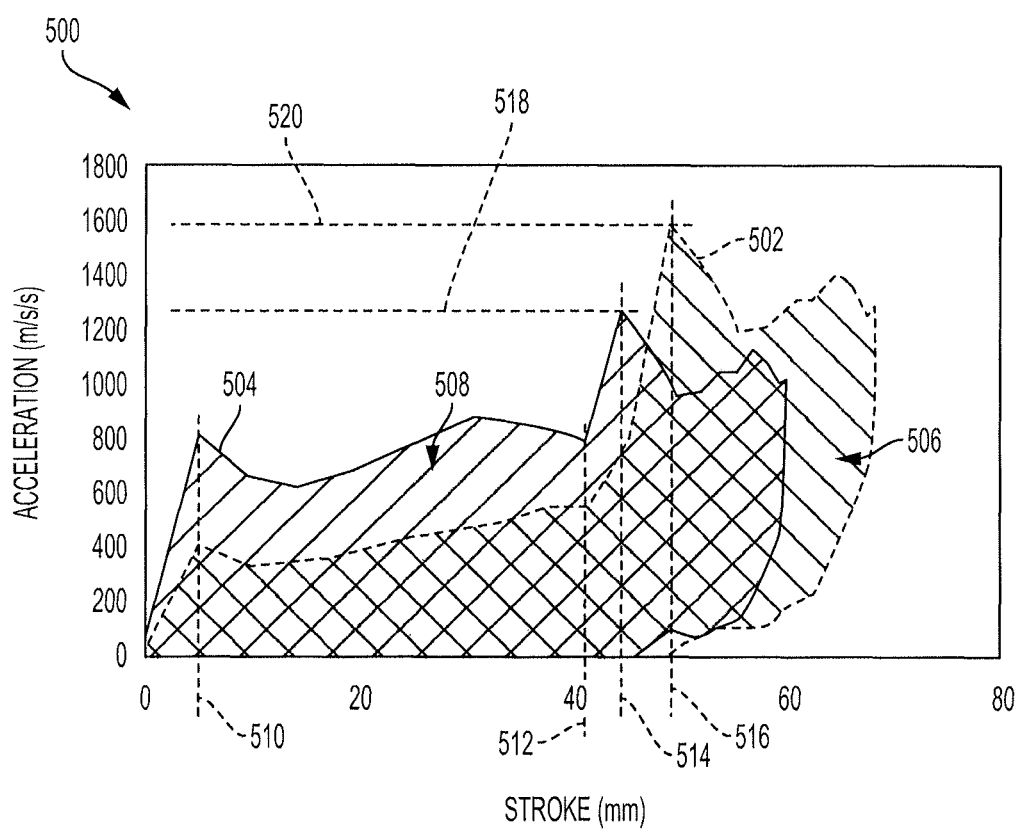
FIG. 5 illustrates a graph comparing impact on the head of a pedestrian when making contact with a hood with a reinforcing patch and with a hood without a reinforcing patch, according to various embodiments of the invention.

FIG. 5 illustrates a graph of the acceleration experienced by a headform (e.g., headform 210 and/or headform 410) when the headform makes contact with a hood (e.g., hood 204 and/or hood 404). The non-patch curve 502 (shown by the dashed line) represents a collision between the headform and a non-reinforced hood, and the patch curve 504 (shown by the solid line) represents a collision between the headform and a hood reinforced with the reinforcing patch.

With respect to the dashed non-patch curve representing the collision between the headform and the non-reinforced hood, the acceleration experienced by the headform spikes at point 510 when the hood outer panel compresses onto the hood inner panel. The hood is being deformed and compressed, and the acceleration begins to rise at point 512 when the hood is compressed onto the headlight compartment. The acceleration continues to rise as the headlight compartment becomes deformed and compressed, and at point 516 the hood outer panel, the hood inner panel, and the headlight compartment have been compressed onto the rigid structural components of the vehicle. The maximum acceleration is reached at value 520.

With respect to the solid patch curve representing the collision between the headform and the reinforced hood, the acceleration experienced by the headform spikes at point 510 when the hood outer panel compresses onto the hood inner panel. The hood is being deformed and compressed, and the acceleration begins to rise at point 512 when the hood is compressed onto the headlight compartment. The acceleration continues to rise as the headlight compartment becomes deformed and compressed, and at point 514, the hood outer panel, the hood inner panel, and the headlight compartment have been compressed onto the structural components of the vehicle. The maximum acceleration is reached at value 518.

The area 506 under the non-patch curve 502 and the area 508 under the patch curve 504 represent the energy absorbed by the headform and the vehicle in this particular collision. The areas 506 and 508 are the same, indicating that the same amount of energy is transferred in both collisions. However, as can be seen from the graph 500, the area 508 under the patch curve 504 is greater between 0 mm and point 512 than the area 506 under the non-patch curve 502 between 0 mm and point 512. This shows that the reinforced hood absorbs more impact from the collision between the beginning and when the hood is fully compressed. Since more of the impact is absorbed by the hood during this stage where the hood is being compressed (between 0 mm and point 512), there is less energy to be transferred when the hood is compressed onto the headlight compartment and further compressed onto the rigid structural components of the vehicle. Thus, the maximum acceleration experienced by the headform from colliding with the reinforced hood (value 518) is less than the maximum acceleration experienced by the headform from colliding with the non-reinforced hood (value 520).

This reduction in maximum acceleration results in a less severe injury to the pedestrian. This reduction in maximum acceleration is made possible by the increased impact absorption by the hood with the reinforcing patch. Again, this increased impact absorption is shown by the greater area under the patch curve 504 compared with the non-patch curve 502 between 0 mm and point 512 when the hood is being deformed.

Figure 6A:
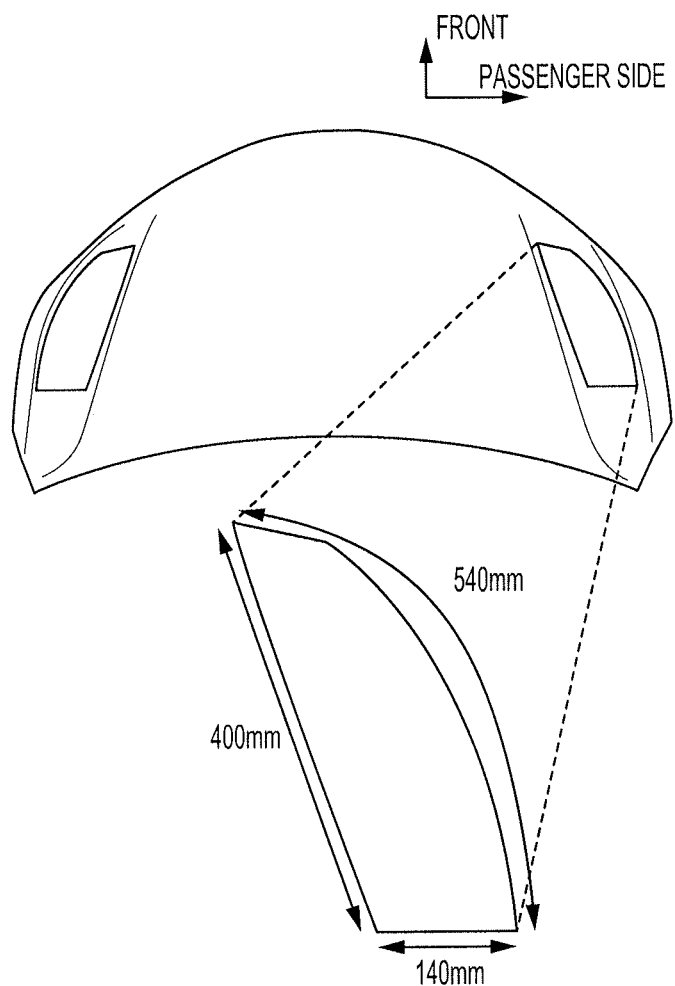
FIG. 6A illustrates a top view of the hood assembly with a reinforcing patch, according to various embodiments of the invention.

FIG. 6A illustrates an example reinforcing patch. The example reinforcing patch has two substantially straight edges connected by a curved edge. The first substantially straight edge has a length of 140 mm, the second substantially straight edge has a length of 400 mm, and the curved edge has a length of 540 mm. The reinforcing patch is located on the driver's side as well as the passenger's side. The reinforcing patch is attached to the interior side of the hood outer panel. The reinforcing patch may vary from about 2 mm thick to about 6 mm thick after curing.

Figure 6B:
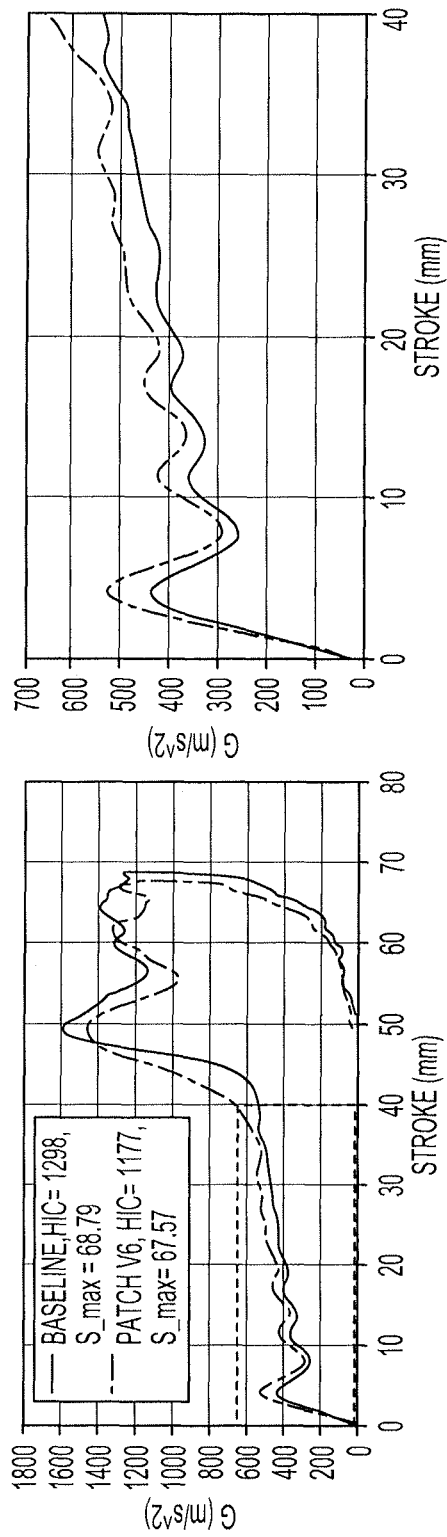
FIG. 6B illustrates computer aided engineering (CAE) simulation data of the example embodiment of the hood assembly of FIG. 6A compared to a hood without a reinforcing patch, according to various embodiments of the invention.
Figure 6B:
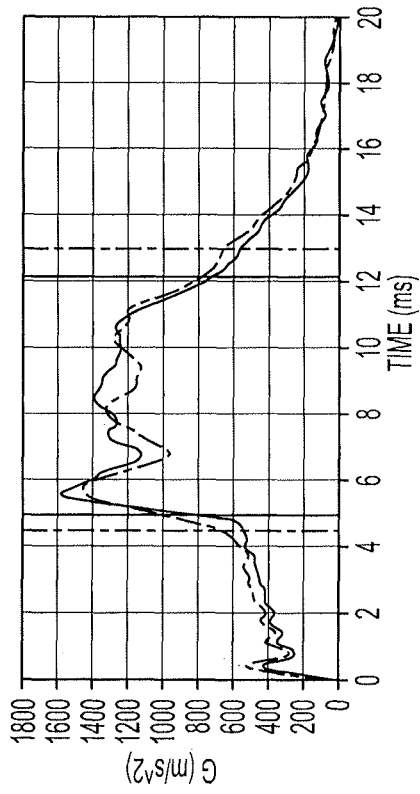

FIG. 6B illustrates test data comparing head injury criterion (HIC) between a headform contacting a hood without the reinforcing patches of FIG. 6A (illustrated in the solid line) and a headform contacting a hood with the reinforcing patches of FIG. 6A (illustrated in the dashed line). As illustrated in the graphs, the hood with the reinforcing patches absorbs more impact earlier in the collision, as compared to the hood without the reinforcing patches. This increased earlier absorption of the impact provides a reduction in the HIC from 1298 from the hood without the reinforcing patches to 1177 from the hood with the reinforcing patches.

Figure 7A:
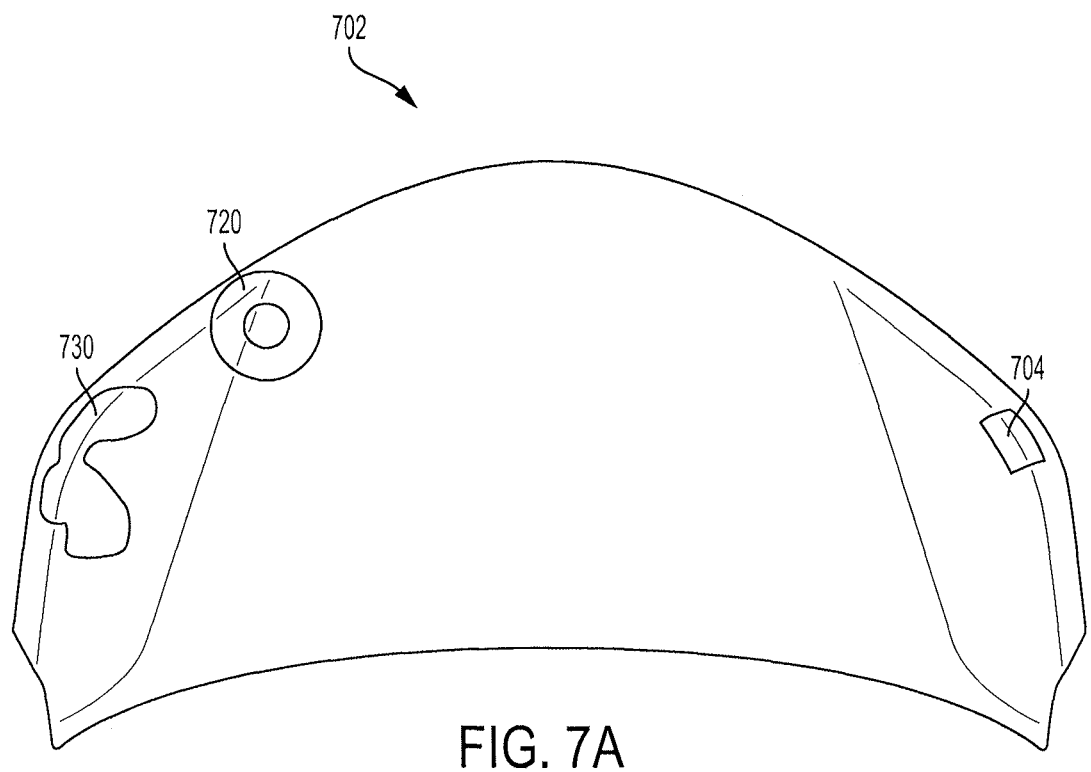
FIGS. 7A-7B illustrate alternative shapes and locations of the reinforcing patch, according to various embodiments of the invention.
Figure 7B:
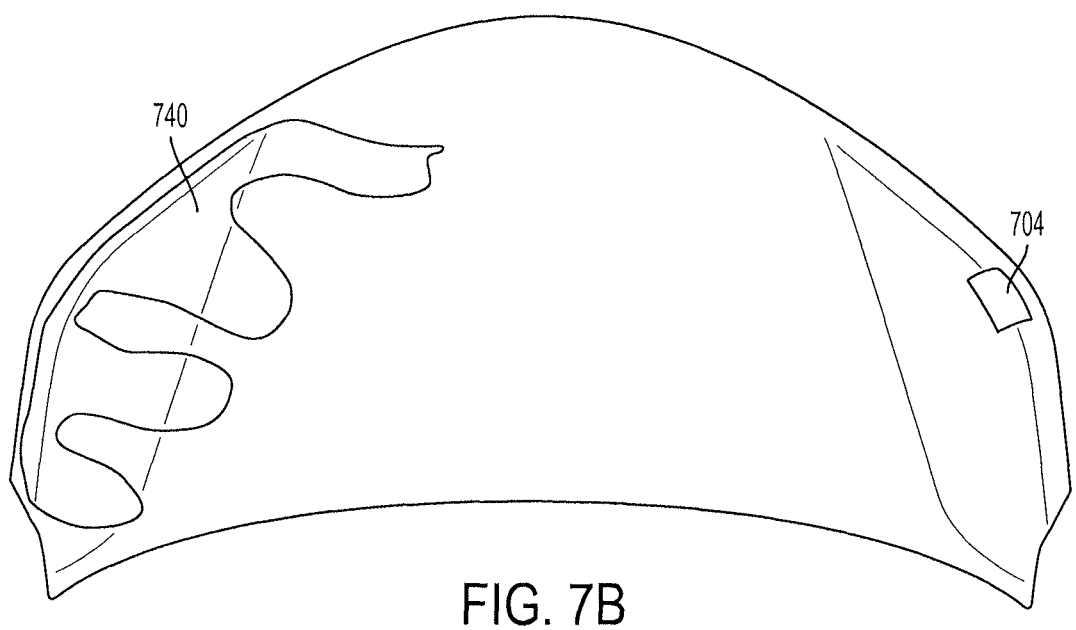

FIGS. 7A and 7B illustrate alternate shapes that the reinforcing patch may have. FIGS. 7A and 7B are views of the interior surface of the hood outer panel of the hood 702. In many embodiments, a reinforcing patch (e.g., 704, 720, 730 or 740) may be disposed on the hood outer panel above a location where a rigid structural component of the vehicle is located. Likewise, a reinforcing patch may not be used on the hood outer panel above locations where rigid structural components of the vehicle are absent or where there is a relatively large distance between the location on the hood and the rigid structural component of the vehicle underneath the hood. In order to reduce cost and weight and increase efficiency, the reinforcing patch may be shaped according to the topography of the rigid vehicle components underneath the hood 702.

The reinforcing patch 704 has a shape similar to the reinforcing patches 304 and 404. The reinforcing patch 720 has a donut shape where an inside circular portion of the reinforcing patch is removed. The hollow circular area of the donut-shaped reinforcing patch 720 may be used to prevent "stack-up" of the hood, the reinforcing patch, and a rigid structural component underneath.

The reinforcing patches 730 and 740 have irregularly shaped borders to accommodate for the topography of the rigid vehicle components underneath the hood 702. The exact shape of these irregularly shaped reinforcing patches 730 and 740, as well as donut-shaped reinforcing patch 720 and reinforcing patch 704 may be based on computer simulations and testing data. That is, these shapes as well as others may be computer-generated based on simulations and test data.

Some of the drawings refer to a "driver's side" as being the left side of the vehicle from the point of view of an occupant of the vehicle, and a "passenger's side" as being the right side of the vehicle from the point of view of an occupant of the vehicle. However, the operative features illustrated in the drawings and described herein may be interchangeable between the left side and the right side of the vehicle, such that the system described herein may be used regardless of whether the "driver's side" is on the left side of the vehicle or the right side of the vehicle and whether the "passenger's side" is on the right side of the vehicle or the left side of the vehicle. Further, the system described herein may be used in any conveyance, such as a vehicle with an internal combustion engine, a vehicle with a motor powered by a battery, a hybrid vehicle having both an engine and a motor, a fully autonomous vehicle, a semi-autonomous vehicle, or a human-driven vehicle, for example.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A hood of a vehicle, comprising:
   a hood outer panel having an exterior surface and an interior surface opposite the exterior surface;
   a hood inner panel connected to the hood outer panel and configured to provide structural support to the hood outer panel, the hood inner panel having an exterior surface facing the interior surface of the hood outer panel and an interior surface; and
   a reinforcing patch connected to the interior surface of the hood outer panel between the hood outer panel and the hood inner panel, at a reinforcing location aligned with one or more structural components of the vehicle, the reinforcing patch configured to increase the rigidity and mass of the hood outer panel at the reinforcing location to absorb energy from a pedestrian struck by the vehicle and to reduce impact from the one or more structural components of the vehicle onto the pedestrian when the hood outer panel and the hood inner panel become compressed onto the one or more structural components of the vehicle, the reinforcing patch being unconnected to the hood inner panel.

2. The hood of claim 1, wherein the reinforcing patch is connected to the hood outer panel by an adhesive.

3. The hood of claim 1, wherein the reinforcing location is above a headlight compartment of the vehicle.

4. The hood of claim 1, wherein the reinforcing patch has an irregular shape corresponding to locations of the one or more structural components of the vehicle located underneath the reinforcing location of the hood outer panel.

5. The hood of claim 1, wherein the one or more structural components have a higher rigidity, a higher mass, and a higher resistance to deformation than the hood outer panel and the hood inner panel.

6. The hood of claim 1, wherein the reinforcing patch has a uniform thickness.

7. The hood of claim 1, wherein the reinforcing patch has varying thicknesses based on locations of the one or more structural components of the vehicle located underneath the reinforcing location of the hood outer panel.

8. The hood of claim 1, wherein the hood outer panel and the hood inner panel are made of a different material than the reinforcing patch.

9. A vehicle for improving pedestrian safety, comprising:
   a hood having:
      a hood outer panel having an exterior surface and an interior surface opposite the exterior surface, and
      a hood inner panel connected to the hood outer panel and configured to provide structural support to the hood outer panel, the hood inner panel having an exterior surface facing the interior surface of the hood outer panel and an interior surface; and a reinforcing patch connected to the interior surface of the hood outer panel between the hood outer panel and the hood inner panel, at a reinforcing location aligned with one or more structural components of the vehicle, the reinforcing patch configured to increase the rigidity and mass of the hood outer panel at the reinforcing location to absorb energy from a pedestrian struck by the vehicle and to reduce impact from the one or more structural components of the vehicle onto the pedestrian when the hood outer panel and the hood inner panel become compressed onto the one or more structural components of the vehicle, the reinforcing patch being unconnected to the hood inner panel.

10. The vehicle of claim 9, wherein the reinforcing patch is connected to the hood outer panel by an adhesive.

11. The vehicle of claim 9, wherein the reinforcing location is above a headlight compartment of the vehicle.

12. The vehicle of claim 9, wherein the reinforcing patch has an irregular shape corresponding to locations of the one or more structural components of the vehicle located underneath the reinforcing location of the hood outer panel.

13. The vehicle of claim 9, wherein the one or more structural components have a higher rigidity, a higher mass, and a higher resistance to deformation than the hood outer panel and the hood inner panel.

14. The vehicle of claim 9, wherein the reinforcing patch has a uniform thickness.

15. The vehicle of claim 9, wherein the reinforcing patch has varying thicknesses based on locations of the one or more structural components of the vehicle located underneath the reinforcing location of the hood outer panel.

16. The vehicle of claim 9, wherein the hood outer panel and the hood inner panel are made of a different material than the reinforcing patch.

17. A hood outer panel assembly of a vehicle, comprising:
a hood outer panel having an exterior surface and an interior surface opposite the exterior surface; and
a reinforcing patch connected to the interior surface of the hood outer panel at a reinforcing location aligned with one or more structural components of the vehicle, the reinforcing patch configured to increase the rigidity and mass of the hood outer panel at the reinforcing location to absorb energy from a pedestrian struck by the vehicle and to reduce impact from the one or more structural components of the vehicle onto the pedestrian when the hood outer panel becomes compressed onto the one or more structural components of the vehicle, the one or more structural components of the vehicle having a higher rigidity, a higher mass, and a higher resistance to deformation than the hood outer panel, the reinforcing patch being unconnected to a hood inner panel.

18. The hood outer panel assembly of claim 17, wherein the reinforcing patch is connected to the hood outer panel by an adhesive.

19. The hood outer panel assembly of claim 17, wherein the reinforcing location is above a headlight compartment of the vehicle.

20. The hood outer panel assembly of claim 17, wherein the reinforcing patch has a uniform thickness.

* * * * *